United States Patent [19]

Shimazaki et al.

[11] 4,204,429
[45] May 27, 1980

[54] THERMOMETER USING A THERMO-SENSITIVE ELEMENT

[75] Inventors: Takaichi Shimazaki, Moroyama; Katsuaki Hazome, Oume, both of Japan

[73] Assignee: Hitachi Iruma Electronic Company Ltd., Tokyo, Japan

[21] Appl. No.: 954,119

[22] Filed: Oct. 24, 1978

[30] Foreign Application Priority Data

Oct. 26, 1977 [JP] Japan .............................. 52-127550

[51] Int. Cl.² .............................................. G01K 7/22
[52] U.S. Cl. ........................ 73/362 AR; 73/DIG. 7; 338/72 R
[58] Field of Search .................... 73/362 AR, DIG. 7; 338/23, 24, 22 R

[56] References Cited

U.S. PATENT DOCUMENTS

| | | | |
|---|---|---|---|
| 3,729,998 | 5/1973 | Mueller et al. | 73/362 AR |
| 3,791,214 | 2/1974 | Keith | 73/362 AR |
| 3,828,332 | 8/1974 | Rekai | 73/362 AR |

*Primary Examiner*—Donald O. Woodiel
*Attorney, Agent, or Firm*—Craig & Antonelli

[57] ABSTRACT

Disclosed is a thermometer using a thermo-sensitive element such as a thermistor, in which in the beginning of temperature measurement energization of the thermo-sensitive element is effected for self-heating thereof so that the temperature of the thermo-sensitive element is raised by the self-heating near the temperature to be measured faster than in case of the heat only received from the object to be measured, and thereafter the cessation of energization makes the temperature of said thermo-sensitive element follow the temperature of the object to be measured and finally equal to the same, resulting in carrying out the measurement in a short time.

10 Claims, 4 Drawing Figures

THERMOMETER USING A THERMO-SENSITIVE ELEMENT

DETAILED DESCRIPTION OF THE INVENTION

This invention relates generally to a thermometer using a thermo-sensitive element such as a thermister, and more particularly to thermometer suited for measuring an approximately constant temperature such as body temperature of an object to be measured.

Generally, in a thermometer temperature sensing means is inserted into or brought into contact with a object to be measured and is heated thereby. The temperature of the temperature sensing means upon being so heated follows that of the object to be measured.

To measure the temperature with high accuracy in this case the difference between the temperature of the object to be measured and that determined by said heating of the temperature sensing portion has to be made negligible. This requires a relatively long time for measurement.

For example, in the case of a clinical thermometer the temperature sensing portion is inserted under the arm or tongue to be heated from room to body temperature. Generally, since the room temperature is 10° to 30° C. it takes from about 3 to 10 minutes before the temperature can be measured with a mercury thermometer once the temperature sensing portion attains the bodily temperature for the measurement thereof. In a thermister-type clinical thermometer using a thermistor as the thermo-sensitive element for the temperature sensing portion, the thermistor can be made compact and its thermal capacity small so that the measurement time can be made less than that required for the mercury system thermometer. However, even the thermistor system requires about 20 to 60 seconds for the measurement of temperature.

SUMMARY OF THE INVENTION

Accordingly, an object of this invention is to provide a thermometer using a thermo-sensitive element capable of measuring temperature in a short time.

Another object of this invention is to provide a thermistor thermometer capable of using the conventional thermistor for the temperature sensing means.

A further object of this invention is to provide a clinical thermometer capable of measuring temperature in a short time.

A still further object of this invention is to provide a clinical thermometer having few measurement errors.

Although a thermo-sensitive element capable of being used in this invention is one of the conventional thermister, the PN junction semiconductor diode and the other one having the function similar to them, the following description will be effected for convenience in case of using the thermistor as a thermo-sensitive element.

In this invention preheating means is used. This preheating means preheats the thermistor approximately to the temperature of the object to be measured. After the operation of said preheating means is stopped, the thermistor is heated by the object to be measured to the temperature which follows that of the object. In this case since the temperature difference between the thermistor and the object to be measured is made small beforehand by the operation of the preheating means, the measurement can be carried out in a short time.

The preheating means is constructed to energize the thermistor which serves as the temperature sensing means. The thermistor is subjected to self-heating by the energization to raise its temperature close to the temperature of the object to be measured. Since the thermistor itself is heated, the preheating structure of this thermistor does not require the addition of any other means such as a heater. It is therefore possible to avoid a degradation in the response of thermistor temperature to the temperature of the object to be measured after the stoppage of preheating, which degradation results from an increase in thermal capacity in the temperature sensing means due to the addition of said other means. The thermistor can make use of the conventional simple structure.

According to this invention the preheating means can be constructed to begin operation immediately after the beginning of temperature measurement in lieu of the normal preheating before the temperature measurement.

In this case the temperature of the thermistor within the energization period is raised by the heat received from the object to be measured and the self-heating of the thermistor itself faster than in the case of the received heat only. The cessation of energization makes the temperature of said thermistor follow the temperature of the object to be measured and finally equal to the same. In this case since the difference between both temperatures is reduced beforehand by the self-heating during energization, the thermistor temperature responds quickly to the temperature of the object to be measured. The temperature of the object can therefore be measured in a short time.

In was considered that the thermistor temperature raised during said period of energization could be either lower or higher than the temperature of the object to be measured if it was close thereto.

According to experiments, however, it was found that the preheating of the thermistor temperature to a value higher than that of the object to be measured during the energization period permitted the temperature of the object to be measured in a shorter time than that preheated to a lower temperature since the thermistor inside a thermistor support or enclosure made of a plastic or metal pipe or the like could beforehand supply the heat near that received from the object to the support or enclosure.

This invention, although not limited in application, can be easily embodied particularly when it relates to an object which maintains an approximately constant temperature such as the human body, but since it permits the preheating means to be simply constructed.

The above and other objects, as well as advantageous features of this invention will become more clear from the following description of the preferred embodiments taken in conduction with the accompanying drawings.

DESCRIPTION OF THE PREFERRED EMBODIMENTS

Figure 1:
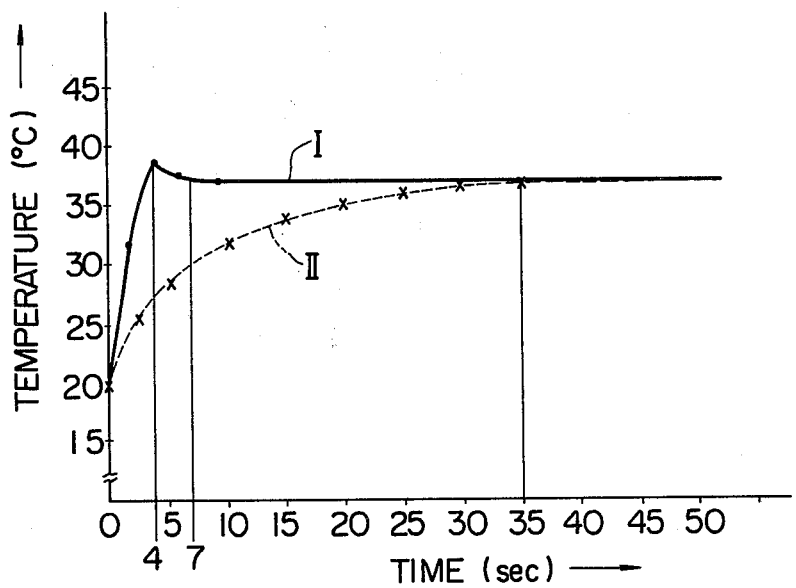
FIG. 1 is a graph showing the relationship between temperature and time in a thermistor.

FIG. 1 is a diagram showing the thermal reaction characteristic curves of a thermistor in the case of this invention in which the preheating is carried out immediately after the thermistor makes contact with the human body, and in the case of the conventional thermistor not preheated. The thermistor used is the TM 550 (name of commodity). This thermistor is enclosed in a 6mm long brass cap with a 2 mm diameter which is constructed to be supported by a Teflon (name of commodity) tube. At 30° C. the resistance of the thermistor is 1.5 kΩ and the thermistor constant is 3400° K.

Preheating is carried out by applying a voltage of 6V across the terminals of thermistor TM 550.

As is apparent from the solid line curve I in FIG. 1, the temperature of thermistor TM 550 is raised from the room temperature of 20° C. to 37° C., which is approximately equal to bodily temperature, 3 seconds after the preheating and then to 38.5° C. 4 seconds later. When the preheating is stopped 4 seconds after the beginning of the preheating, the thermistor is cooled to reach a temperature approximately equal to the bodily temperature 3 seconds later. Accordingly, the measurement can be carried out after 7 seconds.

On the other hand when the preheating is not carried out the temperature of the thermistor becomes approximately equal to the bodily temperature after 35 seconds as shown by the broken line curve II in FIG. 1.

The thermistor thermometer according to this invention will be described in further detail hereinafter with reference to an embodiment applied to a clinical thermistor thermometer.

Figure 2:
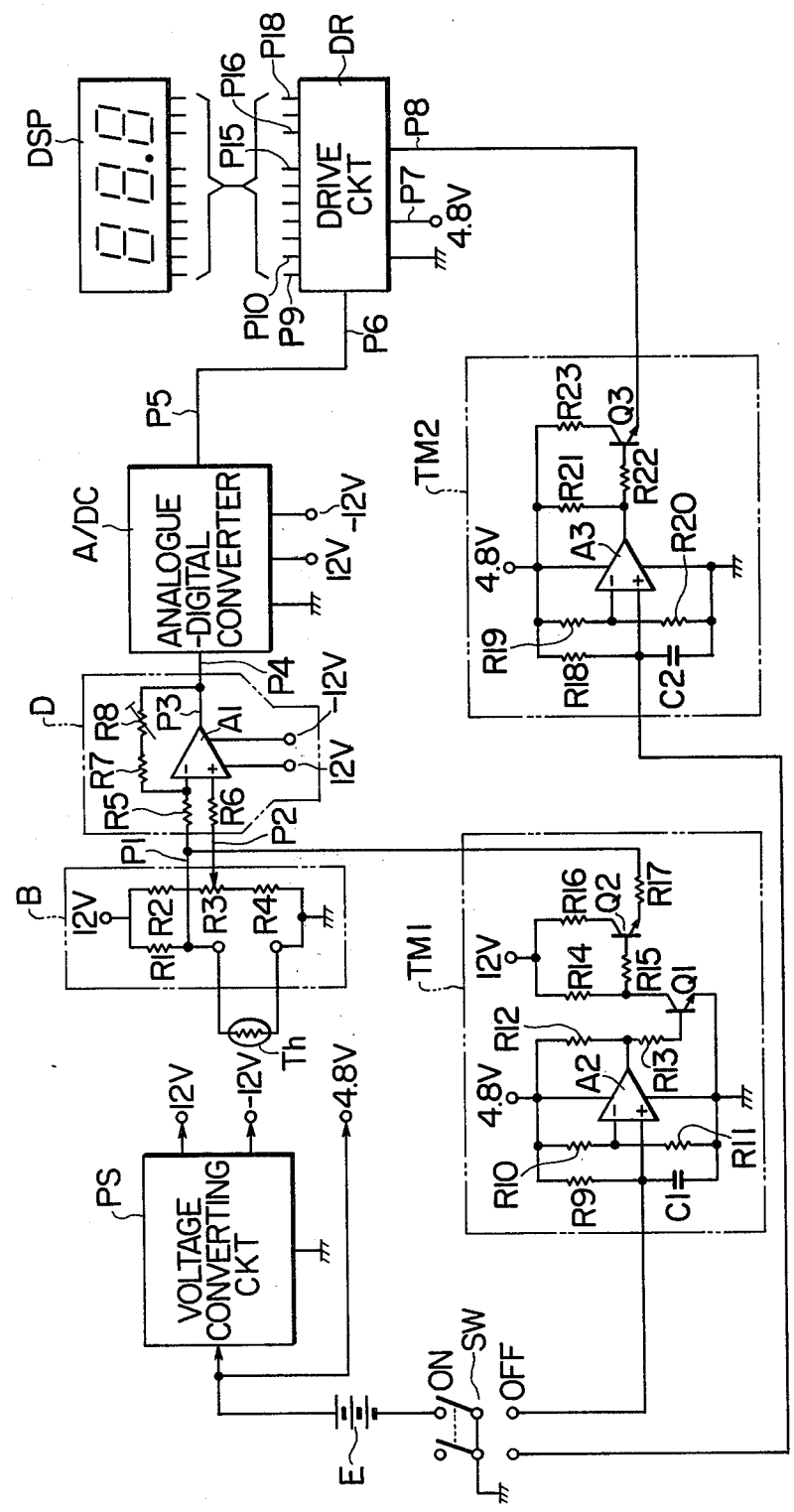
FIG. 2 is a circuit diagram of a clinical thermometer showing an embodiment according to this invention.

FIG. 2 shows a circuit diagram of an embodiment of a clinical thermistor thermometer.

In the same drawing Th is a temperature sensing thermistor. Thermistor Th makes up a bridge circuit B with resistances R1 to R4. This bridge circuit B has a pair of output terminals, one of the terminals being connected to the connection of the thermistor Th and the resistance R1 and the other being connected to the sliding contact of a semi-fixed resistance R3. The balance condition of the bridge circuit is adapted to be obtained by the adjustment of semi-fixed resistance R3 when the temperature of thermistor Th is the predetermined one.

The pair of output terminals of said bridge circuit B are connected to a pair of input terminals of an amplifier D consisting of resistances R5 to R8 and an operational amplifier A1. Resistance R8 is a semi-fixed resistance, the value of which is adjusted by the dispersion of the temperature coefficient of thermistor Th, the dispersion of each of the resistances, etc in the bridge circuit. Consequently, a voltage corresponding to the temperature of thermistor Th appears at the output terminal of the amplifier D.

The output terminal of the amplifier D is connected to the input terminal of an analogue-digital converter A/DC. This converter A/DC generates a digital signal output corresponding to the input voltage.

The output terminal of the converter A/DC is connected to the input terminal of a display unit drive DR having a control terminal P8. If the signal applied to this control terminal has a high voltage level, the display unit DSP is driven in response to the input digital signal. If the signal applied to the control terminals P8 has a low voltage level, the display unit DSP is not driven.

The display unit DSP is constituted from a numerical display unit of three digits in which one digit corresponds to 7 segments and a decimal point segment respectively consisting of luminescent diodes in the well-known 8-shaped arrangement, and is subjected to dynamic drive by the drive DR.

E designates a power source consisting of batteries, SW a power switch consisting of switch contacts and PS a voltage converting circuit.

When the power switch SW is turned from the OFF state to the ON state, the source voltage appears between the anode of power source E and the reference potential point, and the positive or negative converted voltage output is supplied from the voltage converting circuit PS having the input of this source voltage. The output voltage of the power source E is 4.8 volts, for example, as shown in the drawing and the converted voltage is +12 V or −12 V. This voltage is the source voltage of each circuit. TM1 is a timer consisting of resistances R9 to R17, a capacitor C1, an operational amplifier A2 constituting a comparator and npn transistors Q1, Q2. Immediately after the power is supplied, timer TM1 produces the high level voltage at the emitter end of transistor Q2 until the output voltage of the integration circuit consisting of resistance R9 and capacitor C1 becomes equal to that of the potential dividing circuit consisting of resistances R10 and R11 and thereafter produces the low level voltage.

The output end of the timer TM1 is connected to the common connection of the resistance R1 in the bridge circuit and thermistor Th. A voltage far higher than the voltage level determined by the operational conditions of the bridge circuit is applied to thermistor Th by the high level output voltage of the timer TM1. Consequently, the thermistor Th is subjected to self-heating between the time when the source switch SW is turned on and the time determined by the timer TM1. The power required for self-heating of the thermistor Th is adjusted by the resistances R15 to R17.

When the output voltage of the timer TM1 reaches the low level, which is defined so as to be lower than the divided voltage of the resistance R1 and the thermistor Th, the emitter connection of transistor Q2 is reversely biased by the divided voltage of the resistance R1 and the thermistor Th so that the operation of the bridge circuit is not affected by the addition of timer circuit TM1.

Further, to the output end of said integration circuit of the timer TM1 is connected the off contact of the power switch SW by which the capacitor C1 is forcibly discharged. Thus, timer TM1 can be repeatedly operated in a short time.

TM2 is another timer consisting of resistances R18 to R23, a capacitor C2, an operational amplifier A2 and a upn transistor Q3. This timer TM2 applies a high level voltage output to the output end, i.e. the emitter end of the transistor Q3, in a certain time determined by the value of resistances R18 to R20 and capacitor C1 after the power is supplied.

Since the output end of timer TM2 is connected to the control terminal P8 of display unit drive circuit DR, the display of numerals on the display unit DSP is inhibited after the passage of a predetermined time from the supply of power.

The time in timer TM2 is made longer than that in timer TM1 such that each circuit operates as follows.

When the power is supplied by turning the source switch SW to the on state with the thermistor Th being inserted under the arm or tongue, the thermistor Th is preheated by the timer TM1 so that the temperature of the thermistor is raised approximately from room temperature. After the time set by the timer TM1 has elapsed, the preheating is stopped; thereafter, the temperature of the thermistor Th varies so as to be the same as the bodily temperature. After passage of the time in which the temperature of thermistor Th reaches the extent of measurement error of bodily temperature, the display which depends on timer TM2 is released from the inhibited state and the temperature of the thermistor Th, i.e. bodily temperature to be measured, is numerically displayed on the display unit DSP.

In this way the time required for measuring the bodily temperature can be shortened by the preheating of the timer TM1. Also, since the display is carried out by the timer TM2 only when the temperature of thermistor coincides with the bodily temperature, the proper reading time of numerals and accurate measurement can be obtained.

In the circuit the thermistor Th is TM 550, but not limited thereto. In addition the resistances and capacitors are as follows:

R1, R2, R5, R6:20 kΩ
R3:500Ω
R7:51 kΩ
R8:100 kΩ
R9, R18:1 MΩ
R10, R19:15 kΩ
R11:3 kΩ
R12, R14, R15, R19:5.1 kΩ
R13, R22:1 kΩ
R16:200Ω
R17:300Ω
R23:20Ω
C1, C2:22μF

By the above-mentioned elements with respective constants, the timer TM1 comes to apply a preheating voltage of approximately 6V to the thermistor Th for 4 seconds after the power is supplied and the timer TM2 generates the high level output signal for the display 7 seconds after the power is supplied.

Figure 3:
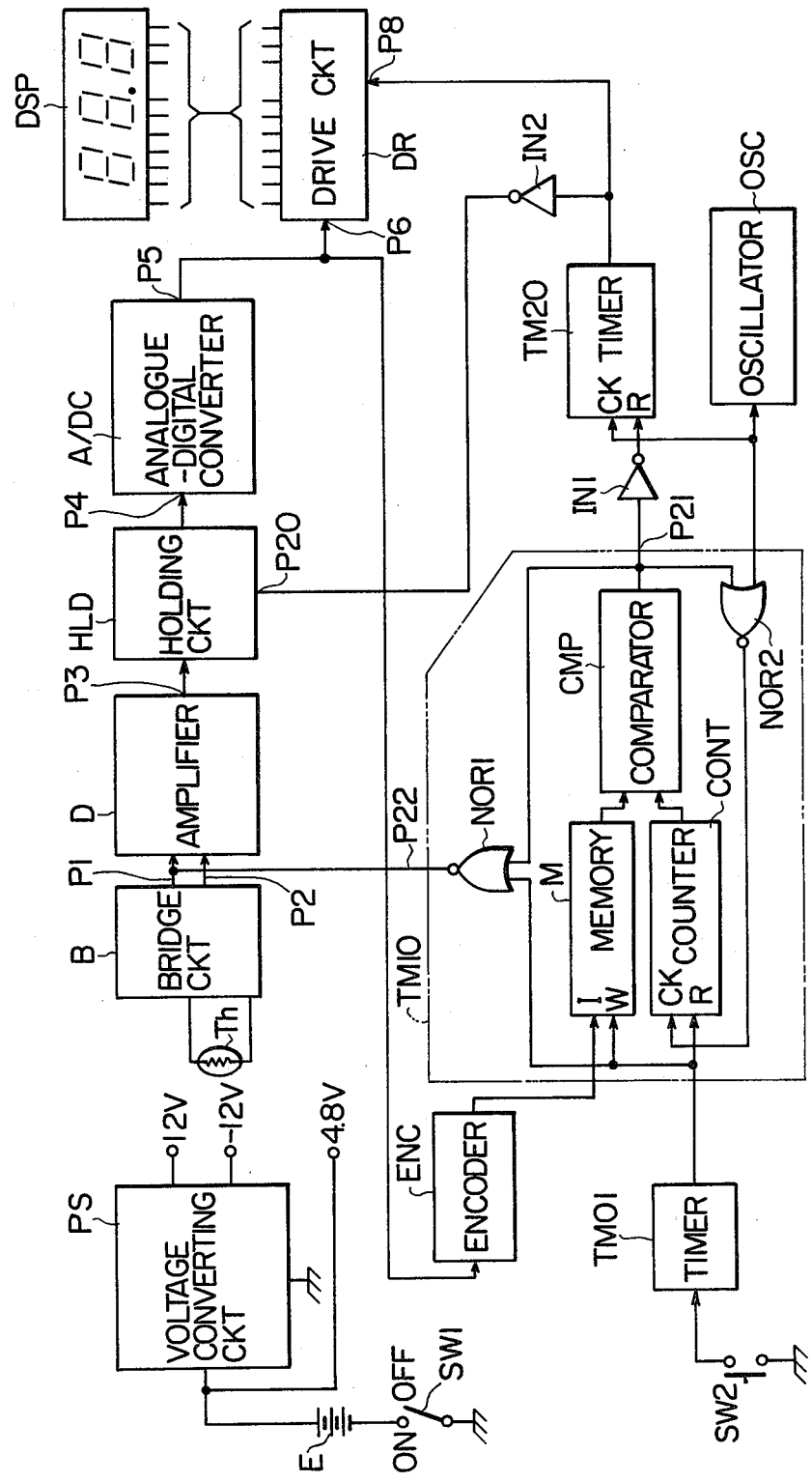
FIG. 3 is a circuit diagram of a clinical thermometer showing another embodiment according to this invention.

FIG. 3 shows a circuit for another embodiment of a clinical thermistor thermometer. In the drawing the same symbols as that in FIG. 2 designate the same circuits as that in FIG. 2.

HLD designates a holding circuit having a control terminal P20 for a holding signal. Since a well-known circuit can be used for this circuit, it is not particularly shown in the drawing. However, it is constructed of an analogue switch consisting of an FET and the like and an anologue memory means consisting of capacitors and an operational amplifier. It carries out a non-holding operation to generate an output signal corresponding to the input signal from the amplifier D if the potential of the control terminal P20 is at the high voltage level. When the potential of control terminal 20 is at the low voltage level, it carries out a holding operation. During this holding operation the output signal is at a certain level corresponding to the input signal during the non-holding operation just before the holding operation.

OSC designates an oscillator circuit which generates a clock signal output.

TMO1 designates the first timer which generates the pulse signal output at a high level for a certain time with the switch SW2 being turned to the on-state. This circuit consists of a signal stabilized multi-vibrator which receives a trigger input the signal from the switch SW2.

TM10 designates the second timer consisting of a memory circuit M, a count circuit CONT, a digital comparator CMP and NOR circuits NOR1, NOR2. The memory circuit M having a data input terminal I, a writing-in control terminal W and an output terminal stores the digital signal input supplied to the input terminal I by the high level signal from the first timer TM01 which supplies an input to the writing-in control terminal W. The count circuit CONT having a clock terminal CK, a reset terminal R and an output terminal is reset by a high level at the reset terminal R and counts the clock signal input supplied to the clock terminal CK by a low level at the clock terminal CK.

The digital comparator CMP receives the output signals from the memory circuit M and the count circuit CONT to generate a low level signal if the digital output signals from these circuits do not coincide with each other, or generate a high level output signal if the signals coincide with each other. The NOR circuit NOR2 inhibits the clock input when the output of digital comparator COM reaches a high level.

Consequently the output signal of the digital comparator CMP reaches a low level only when the output signal of timer TMO1 is at a high level and thereafter designated by the content of memory circuit M. The output signal of NOR circuit NOR1 maintains the high level until the output of comparator CMP reaches the high level after the output signal of timer TMO1 reaches the low level.

ENC designates an encoder circuit receiving a digital signal from the analogue-digital converter A/DC and generating a digital signal output corresponding to the digital signal. Since the output of this circuit ENC is applied to the input of said memory circuit M. Circuit ENC sets the time of timer TM10 in response to the digital signal of converter A/DC.

TM20 designates the third timer, the clock terminal CK of which receives the clock signal and the reset terminal R2 of which receives the output signal from the digital comparator COM through an inverter IN1. This third timer is released from the reset state by the high level output of said comparator CMP. It counts the clock signal from the release of the reset state to generate the high level output signal after a predetermined time.

Figure 4:
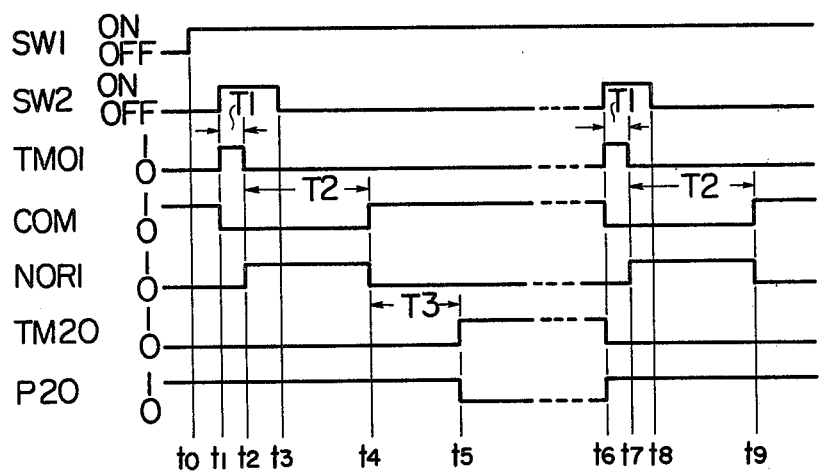
FIG. 4 is a time chart of the circuit shown in FIG. 3.

The time chart of the circuit shown in FIG. 3 is as shown in FIG. 4. When the power switch SW1 is turned to the on-state to commence measurement at time t1, each circuit operates as follows.

The first timer TM01 begins to operate at time t1 to raise the output signal to the high level. By this high level signal the digital signal for indicating time is supplied to the input of the memory circuit M from the encoder ENC. By the signal to the input of the memory circuit M the output signal of the digital comparator CMP is lowered to the low level.

As the output level of the first timer TM01 is lowered to the low level at time t2 after time T1, the second timer TM10 begins to operate. The output signal of comparator CMP returns again to the high level at time t4 after T2.

Accordingly, the output signal of the NOR circuit NOR1 is raised to the high level in time t2 to t4. Since the output of this circuit NOR1 is adapted to be supplied to the thermistor Th, the thermistor is subjected to self-heating in this period of time.

The third timer TM20 begins to operate at time t4. At time t5 after a certain time T3 from time t4 the output signal of timer TM20 is changes from the low level to the high one.

By the output signal of the timer TM20 at time t5, the holding circuit HLD changes from the non-holding to the holding state to apply the display indicating signal to the display unit drive circuit DR.

According to this embodiment the indicated value of the measured temperature is fixed by the holding circuit and each control circuit. Hence, the thermistor does not need to be kept in contact with the human body while the indication is read, thereby facilitating the reading.

The preheating of the thermistor according to the output signal of NOR circuit NOR1 is automatically determined by the timer TM10 which sets time corresponding to this thermistor temperature just prior to the beginning of preheating. When the preliminary temperature of thermistor Th is low, the preheating time becomes longer and when high it becomes shorter. Thus, the temperature of thermistor Th just prior to the completion of preheating becomes approximately constant, whatever the ambient temperature may be to permit more accurate measurement of bodily temperature. According to the adjusting system of said preheating time by the preliminary temperature of the thermistor, the preheating time can be shortened in the case of repeated measurement of bodily temperature for a number of persons or points.

Further, the repeated measurement with the power switch SW1 being kept in the on-state can be carried out by depressing the push-button switch SW2 again to the on-state, for example, as shown at time t6 of FIG. 4.

What is claimed:

1. A thermometer using a thermo-sensitive element comprising:
   a thermo-sensitive element operable to provide an electric output signal in response to the temperature thereof, said thermo-sensitive element having at least two terminals for providing the electric output signal therebetween in response to the change in the temperature thereof;
   preheating means for raising the temperature of said thermo-sensitive element to a predetermined temperature in relation to the temperature of an object to be measured by self-heating under energization of said thermo-sensitive element through said two terminals of the thermo-sensitive element; and
   temperature measuring means for measuring the electric output signal of said thermo-sensitive element in response to said temperature of the object while the energization of said thermo-sensitive element from said preheating means is stopped.

2. A thermometer as claimed in claim 1, wherein said preheating means includes first timer means for determining the period during which said thermo-sensitive element is preheated, and wherein said temperature measuring means includes second timer means for determining the time for the beginning of temperature measurement.

3. A thermometer as claimed in claim 1 or 2, wherein said preheating means is adapted so as to control energization of said thermo-sensitive element in response to the ambient temperature of said thermo-sensitive element.

4. A thermometer as claimed in claim 1 or 2, wherein said temperature measuring means includes display means for receiving a digital signal responding to said electric output signal of the thermo-sensitive element and indicating the temperature of said thermo-sensitive element.

5. A thermometer as claimed in claim 1 or 2, wherein said thermo-sensitive element is a thermistor.

6. A thermometer as claimed in claim 1 or 2, wherein said thermometer is a clinical thermometer in which said thermo-sensitive element is preheated to a temperature near the bodily temperature by said preheating means.

7. A thermometer using a thermo-sensitive element comprising:
   a thermo-sensitive element operable to provide an electric output signal in response to the temperature thereof, said thermo-sensitive element having at least two terminals for providing the electric output signal therebetween in response to the change in the temperature thereof;
   preheating means for raising the temperature of said thermo-sensitive element to a predetermined temperature in relation to the temperature of an object to be measured by self-heating under energization of said thermo-sensitive element through said two terminals of the thermo-sensitive element during a first period, said preheating means including first timer means for determining said first period; and
   temperature measuring means for measuring the electric output signal of said thermo-sensitive element in response to said temperature of the object by stopping the energization of said thermo-sensitive element from said preheating means during a second period after said first period, said temperature measuring means including second timer means for determining the beginning of said second period.

8. A thermometer as claimed in claim 7, wherein said thermometer is a clinical thermometer and said preheating means is adapted so as to preheat said thermo-sensitive element to a temperature slightly above a range of the bodily temperature to be measured.

9. A thermometer for measuring the temperature of an object, comprising:
   a variable resistance element responsive to an ambient temperature and representative of a change in resistance over a change in temperature of said variable resistance element, said variable resistance element having two resistance terminals for providing said change in resistance therebetween;
   preheating means for supplying a preheating current through said variable resistance element between said two resistance terminals during a first period, thereby to raise the temperature of said variable resistance element to a predetermined temperature in relation to a range of the temperature of the object to be measured; and
   temperature measuring means for measuring an electric signal corresponding to a resistance between said two resistance terminals of the variable resistance in response to a temperature of the object to be measured under suspension of said preheating current from said preheating means during a second period after said first period.

10. A thermometer as claimed in claim 9, wherein said thermometer is a clinical thermometer and said preheating means is adapted so as to preheat said variable resistance element to a temperature slightly above a range of the bodily temperature to be measured by said preheating current through said variable resistance.

* * * * *